United States Patent Office  
3,193,572  
Patented July 6, 1965

3,193,572  
PHOSPHORIC ESTERS OF EPHEDRINE  
Angelo Larizza and Giovanni Brancaccio, Naples, Italy, assignors to Farmochimica Cutolo-Calosi, a corporation of Italy  
No Drawing. Filed Oct. 22, 1962, Ser. No. 232,266  
Claims priority, application Italy, Oct. 26, 1961, 19,638/61; Aug. 1, 1962, 15,879/62  
8 Claims. (Cl. 260—461)

Our invention relates to novel chemical compounds which may be regarded as derivatives of ephedrine. More particularly, our invention relates to phosphoric esters of ephedrine.

The new compounds can be represented by the formula:

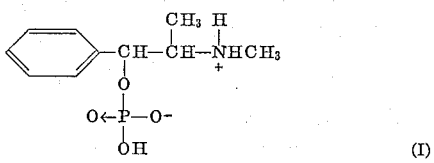

(I)

The new compounds can be prepared and used as the free base and also can be isolated and used in the form of their salts with appropriate acids or bases. The presence of a basic functional group (amino group) and an acid functional group (phosphoric radical) provide functional groups for salt formation with acids or bases. Suitable salts with acids includes hydrochloric, citric, maleic, tartaric and other pharmaceutically acceptable acid addition salts. Suitable salts with bases include alkali and alkaline earth metals, cyclohexylammonium and ammonium salts. The new compounds can exist as the racemic mixture and also as optically active isomers. Our invention includes the compounds in the above forms.

The new compounds (I) can be prepared by reacting ephedrine (1-phenyl-2-methyl-amino-propan-1-ol)

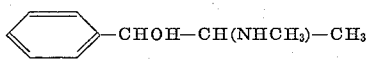

with phosphorous oxychloride to form an intermediate, 2 - chloro - 3,4 - dimethyl - 5 - phenyl - 2 - oxide - 1,3,2 - oxazophospholidine of the formula

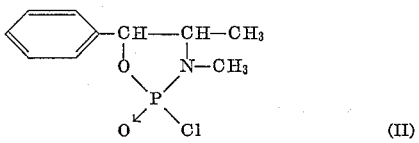

(II)

followed by heating of the intermediate (II) to break the heterocyclic ring to form the hydrochloride of (I) of the formula

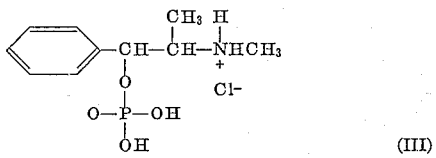

(III)

which hydrochloride (III) can be treated with an anionic ion exchange material to form the phosphoric ester of ephedrine (I). By treating the ester (I) with appropriate acids or bases salts can be formed. The reaction of ephedrine with the phosphorous oxychloride is carried out with the ephedrine dissolved in an inert solvent, such as benzene, ether, chloroform or carbon tetrachloride, and in the presence of a hydrogen halide acceptor such as a tertiary organic base, e.g., triethylamine. The heating of the oxazophospholidine intermediate (II) is carried out by heating a suspension of the intermediate in water or hydrochloric acid solution.

The new compounds are useful generally for the same purposes as ephedrine, i.e., as sympathomimetic agents. They are distinguished from ephedrine in their conspicuously lower toxicity and less evident side effects such as central nervous system excitation and cardiovascular effects. The L-ephedrine phosphoric ester is, moreover, particularly distinguished by its antibronchospastic activity which it possesses in vitro and in vivo and is thus particularly useful as an antibronchospastic agent. L-ephedrine, the most powerful of the three optical isomers of ephedrine, possesses, as is known, antibronchospastic activity in vitro but not in vivo. The other optical isomer and the racemic mixture of ephedrine and their corresponding phosphoric esters while possessing antibronchospastic activity in vitro do not posses it in vivo.

The new compound can be administered by the same methods as ephedrine, i.e., orally and parenterally, e.g. intramuscularly, in dosages ranging from about 25 to about 30 mg. with a maximum daily dose of about 150 mg. Preferably, the compounds are administered orally.

Our invention will be further illustrated by the following examples:

EXAMPLE 1.—L - 2 - CHLORO - 3,4 - DIMETHYL - 5 - PHENYL - 2 - OXIDE - 1,3,2 - OXAZOPHOSPHOLIDINE (II)

To a solution of L-ephedrine (165 g., 1 mol) and triethylamine (300 cc., 2.1 mol) in 3 l. of benzene was added dropwise with stirring a solution of phosphorous oxychloride in 500 cc. of benzene, taking care that the temperature did not overcome 50°. After the addition was completed the mixture was stirred for further 4–5 hours; then the solution was filtered. The solvent was removed by evaporation under reduced pressure and the residue was extracted several times with petroleum ether (60–68°).

The combined extracts were placed in ice-box for 24 hours; the solid separated was filtered and dried: 176 g. of L-2-chloro-3,4-dimethyl-5-phenyl-2-oxide-1,3,2-oxazophospholidine were obtained as white crystalline substance, M.P. 90–1°.

*Analysis*

| | C | H | Cl | N | P |
|---|---|---|---|---|---|
| Calculated for $C_{10}H_{13}ClPNO_2$ | 48.90 | 5.34 | 14.43 | 5.70 | 12.64 |
| Found | 49.10 | 5.50 | 14.50 | 5.74 | 12.85 |

EXAMPLE 2.—L - 1 - PHENYL - 2-METHYLAMINO-PROPAN - 1-PHOSPHATE HYDROCHLORIDE (L-EPHEDRINE PHOSPHORIC ESTER HYDROCHLORIDE) (III)

A suspension of 20 g. of L-2-chloro-3,4-dimethyl-5-phenyl-2-oxide-1,3,2-oxazophospholidine (II) of Example 1 in 100 cc. of 1 N hydrochloric solution was heated on the steam bath for 1 hour. The solution, filtered after treatment with 1 g. of decolourising carbon, was evaporated under reduced pressure at 40–45°. The residue gave a powder upon treatment with acetone. After drying the yield of the 1-phenyl-2-methylamino-propan-1-phosphate hydrochloride, M.P. 173–4° (from ethanol-ether) and $[\alpha]_D^{25} = 48.6$, was 17.5 g.

*Analysis*

| | C | H | Cl | N | P |
|---|---|---|---|---|---|
| Calculated for $C_{10}H_{17}ClNO_4P$ | 42.64 | 6.09 | 12.59 | 4.98 | 11.01 |
| Found | 42.88 | 6.22 | 12.68 | 5.16 | 10.96 |

EXAMPLE 3.—L-1-PHENYL-2-METHYLAMINO-PROPAN-1-PHOSPHATE (L-EPHEDRINE PHOSPHORIC ESTER) (I)

56 g. of L-1-phenyl-2-methylamino-propan-1-phosphate hydrochloride (L-ephedrine phosphoric ester hydrochloride) (III) of Example 2 were dissolved in distilled water and treated with Amberlite IR 410 anionic ion exchange-resin until pH 4 was reached. After filtration and washing, several times, of the resin with water, the aqueous combined washings were evaporated under reduced pressure until water was completely removed. The residue, washed with ethanol and then ether, was L-1-phenyl-2-methylamino-propan-1-phosphate and weighed 41.2 g., M.P. 242–3° and $[\alpha]_D^{25}=55.1$ (c. 1.5, in water).

Analysis

|  | C | H | N | P |
|---|---|---|---|---|
| Calculated for $C_{10}H_{16}NO_4P$ | 48.98 | 6.58 | 5.76 | 12.66 |
| Found | 49.10 | 6.80 | 5.84 | 12.51 |

EXAMPLE 4.—BARIUM SALT OF L-1-PHENYL-2-METHYLAMINO-PROPAN-1-PHOSPHATE (BARIUM SALT OF L-EPHEDRINE PHOSPHORIC ESTER)

To an aqueous solution of L-1-phenyl-2-methylamino-propan-1-phosphate (L-ephedrine phosphoric ester) (I) of Example 3 (6 g. in 25 cc. of water) was added a barium acetate solution (8.2 g. in 30 cc. of water). The barium salt of I precipitated. It was filtered, washed with ethanol and ether and then dried in vacuo at 100° for 12 hours, M.P. 192–3°.

Analysis

|  | N | P | Ba |
|---|---|---|---|
| Calculated for $C_{20}H_{30}N_2O_8P_2Ba$ | 4.47 | 9.90 | 21.93 |
| Found | 4.30 | 9.98 | 21.85 |

EXAMPLE 5.—SODIUM SALT OF L-1-PHENYL-2-METHYLAMINO-PROPAN-1-PHOSPHATE (SODIUM SALT OF L-EPHEDRINE PHOSPHORIC ESTER)

To a solution of 2.5 g. of L-1-phenyl-2-methylamino-propan-1-phosphate (L-ephedrine phosphoric ester) (I) of Example 3 in 5 cc. of water were added 10 cc. of 1 N sodium hydroxide solution (F=1). The solution was evaporated under reduced pressure to dryness. The residue was washed with ethanol and ether and then dried in vacuo at 100° for 12 hours, to give the sodium salt of (I), M.P. 254° (evacuated capillary).

Analysis

|  |  |  |  |
|---|---|---|---|
| Calculated for $C_{10}H_{15}NO_4PNa$ | 5.25 | 11.61 | 8.60 |
| Found | 5.47 | 11.72 | 8.64 |

EXAMPLE 6.—CYCLOHEXYLAMMONIUM SALT OF L-1-PHENYL-2-METHYLAMINO-PROPAN-1-PHOSPHATE (CYCLOHEXYLAMMONIUM SALT OF L-EPHEDRINE PHOSPHORIC ESTER)

To a solution of 2.5 g. of L-1-phenyl-2-methylamino-porpan-1-phosphate (L-ephedrine phosphoric ester) (I) of Example 3 in 15 cc. of water were added 2 cc. of cyclohexylamine. After filtration and removing of the solvent, the residue was crystallized from ethanol and then dried in vacuo at 100° for 12 hours, to produce the cyclohexylammonium salt of (I), M.P. 234°.

Analysis

|  | N | P |
|---|---|---|
| Calculated for $C_{16}H_{29}N_2O_4P$ | 8.13% | 9.01% |
| Found | 7.90% | 8.89% |

EXAMPLE 7.—AMMONIUM SALT OF L-1-PHENYL-2-METHYLAMINO-PROPAN-1-PHOSPHATE (AMMONIUM SALT OF L-EPHEDRINE PHOSPHORIC ESTER)

To a solution of 2.5 g. of L-1-phenyl-2-methylamino-propan-1-phosphate (L-ephedrine phosphoric ester) (I) of Example 3 in 5 cc. of water were added 10 cc. of 1 N ammonium hydroxide. The solution was evaporated under reduced pressure to dryness. The residue was washed with ethanol and ether and then dried in vacuo at 100° for 12 hours, to produce the ammonium salt of (I), M.P. 241–2°.

Analysis

|  | N | P |
|---|---|---|
| Calculated for $C_{10}H_{19}N_2O_4P$ | 10.68% | 11.83% |
| Found | 10.62% | 11.94% |

EXAMPLE 8.—DL-2-CHLORO-3,4-DIMETHYL-5-PHENYL-2-OXIDE-1,3,2-OXAZOPHOSPHOLIDINE (II)

To a solution of 16.5 g. of DL-ephedrine and 30 cc. of triethylamine in benzene were added 10 cc. of phosphorus oxychloride in benzene. The triethylamine hydrochloride formed was discarded; the solvent was removed under reduced pressure, and the residue was extracted, several times, with petroleum ether (60–68°). The combined extracts, placed in the ice-box for 24 hours, were allowed to separate: 16.8 g. of the related DL-2-chloro-3,4-dimethyl-5-phenyl-2-oxide-1,3,2-oxazophospholidine, M.P. 79–80°, were obtained.

Analysis

|  | C | H | Cl | N | P |
|---|---|---|---|---|---|
| Calculated for $C_{10}H_{13}ClNO_2P$ | 48.90 | 5.34 | 14.43 | 5.70 | 12.64 |
| Found | 48.78 | 5.37 | 14.49 | 5.56 | 12.78 |

EXAMPLE 9.—D-2-CHLORO-3,4-DIMETHYL-5-PHENYL-2-OXIDE-1,3,2-OXAZOPHOSPHOLIDINE (II)

D-ephedrine was reacted in the same manner as Example 8 with phosphorus oxychloride and the reaction product, D-2-chloro-3,4-dimethyl-5-phenyl-2-oxide-1,3,2-oxazophospholidine, M.P. 90–1° and $[\alpha]_D^{25}=+75.2$ (c.=2 in benzene) was similarly isolated.

Analysis

|  | C | H | Cl | N | P |
|---|---|---|---|---|---|
| Calculated for $C_{10}H_{13}ClNO_2P$ | 48.90 | 5.34 | 14.43 | 5.70 | 12.64 |
| Found | 48.72 | 5.57 | 14.56 | 5.58 | 12.51 |

EXAMPLE 10.—DL-1-PHENYL-2-METHYLAMINO-PROPAN-1-PHOSPHATE HYDROCHLORIDE (DL-EPHEDRINE PHOSPHORIC ESTER HYDROCHLORIDE) (III)

A suspension of 10 g. of DL-2-chloro-3,4-dimethyl-5-phenyl-2-oxide-1,3,2-oxazophospholidine (II) of Example 8 in 15 cc. of 1 N hydrochloric acid solution was heated on a steam bath for 1 hour. The solution, filtered after treatment with decolourising carbon, was evaporated under reduced pressure until water was completely removed. The pasty residue consisted of DL-ephedrine phosphoric ester hydrochloride.

EXAMPLE 11.—D-1-PHENYL-2-METHYLAMINO-PROPAN-1-PHOSPHATE HYDROCHLORIDE (D-EPHEDRINE PHOSPHORIC ESTER HYDROCHLORIDE) (III)

D-ephedrine phosphoric ester hydrochloride was prepared and isolated, in the same manner as Example 10 using the oxazopholidine of Example 9, in the form of crystals, M.P. 173–4° and $[\alpha]_D^{25} = +49.5$ (c.=2 in water).

*Analysis*

|  | C | H | Cl | N | P |
|---|---|---|---|---|---|
| Calculated for $C_{10}H_{17}ClNO_4P$ | 42.64 | 6.09 | 12.59 | 4.98 | 11.01 |
| Found | 42.52 | 6.01 | 12.73 | 5.11 | 11.20 |

EXAMPLE 12.—DL-1-PHENYL-2-METHYLAMINO-PROPAN-1-PHOSPHATE (DL-EPHEDRINE PHOSPHORIC ESTER) (I)

The pasty residue of Example 10 consisting of DL-ephedrine phosphoric ester hydrochloride, was dissolved in 50 cc. of distilled water and treated with Amberlite I.R. 410 anionic ion exchange resin unit pH 4 was reached. After filtration and washing, several times, of the resin with water, the aqueous combined washings were evaporated under reduced pressure until water was completely removed. The residue, washed with ethanol and then ether, was DL-1-phenyl-2-methylamino-propan-1-phosphate and weighed 6.5 g., M.P. 250–2°.

*Analysis*

|  | C | H | N | P |
|---|---|---|---|---|
| Calculated for $C_{10}H_{16}NO_4P$ | 49.02 | 6.58 | 5.76 | 12.66 |
| Found | 48.91 | 6.73 | 5.61 | 12.46 |

EXAMPLE 13.—D-1-PHENYL-2-METHYLAMINO-PROPAN-1-PHOSPHATE (D-EPHEDRINE PHOSPHORIC ESTER) (I)

D-ephedrine phosphoric ester, obtained after treatment of the aqueous solution of the D-ephdrine phosphoric ester hydrochloride of Example 9 with Amberlite I.R. 410 anionic ion exchange resin and isolation in the same manner as Example 12, melted at 242–3° and showed $[\alpha]_D^{25} = +56.3$ (c.=2 in water).

*Analysis*

|  | C | H | N | P |
|---|---|---|---|---|
| Calculated for $C_{10}H_{16}NO_4P$ | 49.02 | 6.58 | 5.76 | 12.66 |
| Found | 48.88 | 6.44 | 5.68 | 12.59 |

In the above Examples 1–13, the temperatures are expressed in degrees centigrade. The compounds of Examples 12 and 13 can be reacted in the same manner as in Examples 4, 5, 6 and 7 to produce the barium, sodium, cyclohexylammonium and ammonium salts.

The compounds of the invention can be used in conventional dosage forms, e.g., tablets, capsules, oral suspensions, syrups and injectable suspensions and solutions, by their incorporation with conventional pharmaceutical carriers, e.g., sugar, corn starch, gelatin, water, and preparation of the dosage form by conventional means.

The following examples illustrate suitable pharmaceutical compositions including a pharmaceutical carrier and the new compounds. In these examples, the quantities are given for single units, it being understood that in actual practice, the dosage forms will be prepared in suitable quantities, and the amounts adjusted accordingly.

EXAMPLE 14

*Tablets, 25 mg.*—Twenty-five mg. of the L-ephedrine phosphate of Example 3, 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

EXAMPLE 15

*Capsules, 25 mg.*—Twenty-five mg. of the L-ephedrine phosphate of Example 3 is admixed with corn starch in quantity required to provide sufficient bulk for the desired size capsule, and the mixture is encapsulated.

EXAMPLE 16

*Injectable suspension, 25 mg. per ml.*—The following ingredients are sterilized separately: 25 mg. of the L-ephedrine phosphate of Example 3, 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

EXAMPLE 17

*Liquid (syrup), 25 mg. per teaspoon.*—Twenty-five mg. of the L-ephedrine phosphate of Example 3 is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

EXAMPLE 18

*Injectable solution, 25 mg. per ml.*—Twenty-five mg. of the L-ephedrine phosphate of Example 3 and water for injection q.s. one ml. are mixed and warmed gently till solution is accomplished. The solution is filtered through fine sintered glass, filled into sterile one ml. ampuls, and sterilized.

The other ephedrine phosphates and their salts of Examples 2, 4, 5, 6, 7 and 10–13 can also be used to prepare pharmaceutical preparations such as those of Examples 14 to 18.

We claim:
1. Phosphoric ester of ephedrine.
2. Phosphoric ester of D-ephedrine.
3. Phosphoric ester of L-ephedrine.
4. Phosphoric ester of DL-ephedrine.
5. As an intermediate in the preparation of the ester of claim 1, 2-chloro-3,4-dimethyl-5-phenyl-2-oxide,1,3,2-oxazophospholidine.
6. As an intermediate in the preparation of the ester of claim 2, D-2-chloro-3,4-dimethyl-5-phenyl-2-oxide-1,3,2-oxazophospholidine.
7. As an intermediate in the preparation of the ester of claim 3, L-2-chloro-3,4-dimethyl-5-phenyl-2-oxide-1,3,2-oxazophospholidine.
8. As an intermediate in the preparation of the ester of claim 4, DL-2-chloro-3,4-dimethyl-5-phenyl-2-oxide-1,3,2-oxazophospholidine.

References Cited by the Examiner

UNITED STATES PATENTS 2,346,154  4/54  Denison et al. _____ 260—461
2,865,948  12/58  Fusco et al. _____ 260—461

CHARLES B. PARKER, *Primary Examiner.*

IRVING MARCUS, *Examiner.*